(12) United States Patent
Kite et al.

(10) Patent No.: US 7,065,181 B2
(45) Date of Patent: Jun. 20, 2006

(54) SYSTEM AND METHOD FOR IMPROVING THE AUTOMATED LOOP MAKEUP PROCESS

(75) Inventors: Joshua W. Kite, Atlanta, GA (US); Steven C. Leathers, Douglasville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 546 days.

(21) Appl. No.: 10/307,978

(22) Filed: Dec. 3, 2002

(65) Prior Publication Data

US 2004/0107211 A1    Jun. 3, 2004

(51) Int. Cl.
*H04M 1/24*    (2006.01)
*H04M 3/08*    (2006.01)
*H04M 3/22*    (2006.01)
*H04M 3/42*    (2006.01)
*H04M 3/00*    (2006.01)

(52) U.S. Cl. .................. 379/15.03; 379/9; 379/9.04; 379/201.12; 379/246

(58) Field of Classification Search .............. 379/9, 379/9.02, 9.03, 9.04, 15.03, 201.03, 201.12, 379/243, 15.01, 245, 246, 326

See application file for complete search history.

(56) References Cited

U.S. PATENT DOCUMENTS

| | | | | |
|---|---|---|---|---|
| 5,355,405 A | * | 10/1994 | Bernstein | 379/246 |
| 5,450,468 A | * | 9/1995 | Bushnell | 379/22.07 |
| 5,491,742 A | * | 2/1996 | Harper et al. | 379/201.12 |
| 5,687,224 A | * | 11/1997 | Alley et al. | 379/201.12 |
| 5,881,131 A | * | 3/1999 | Farris et al. | 379/15.03 |
| 6,546,095 B1 | * | 4/2003 | Iverson et al. | 379/201.12 |
| 6,873,622 B1 | * | 3/2005 | Dodson et al. | 370/420 |

* cited by examiner

*Primary Examiner*—Quoc Tran
(74) *Attorney, Agent, or Firm*—Withers & Keys, LLC

(57) ABSTRACT

Automatic generation of loop make-up eliminates the need to match terminal names. A furthest feature from the origination of a particular pair range is determined. Using the determined furthest feature, one or more loop make-ups is generated by running the loop make-up for the circuit from the determined furthest feature to the origination of the pair range. Loop make-ups can be generated for a pair range as a whole or for individual complements in the pair range.

22 Claims, 7 Drawing Sheets

SYSTEM AND METHOD FOR IMPROVING THE AUTOMATED LOOP MAKEUP PROCESS

BACKGROUND

1. Field of the Invention

The present invention relates generally to loop facilities management in a telephone company network. More specifically, the present invention relates to improving the automated loop makeup process.

2. Background of the Invention

Information regarding the physical layout of telephone network facilities is generally stored in two basic systems—a facilities database system and an assignment database system. The facilities database system stores the information in plats in one of two forms—a paper form and a mechanized form (described later). Traditionally, plats were paper records or a series of paper records which show the telephone systems network facilities superimposed on a land base map that shows features of the land. These land features include, for example, roads, streets, and major geological features such as rivers and lakes. Thus, the plats provide a graphical view of the relationship of the telephone system network's facilities to the land features. For example, a plat can show that a telephone cable is routed up north along Main Street on the west side of the road and then that the cable is routed west along First Street.

Information about the telephone facilities described on a plat is also typically included on the plat. For example, information such as a facility's type, year it was placed into use and its size can be provided on the plat. Where a telephone system facility is a cable, for example, its size in terms of the number of copper wire pairs it contains, as well as their length and gauge are typically included on the plat. Other facility types include poles, conduits, terminals and other telephone network equipment. Other information can also be provided on the plat depending on the facility type. Continuing the example where the facility is a cable, the plat can also provide information as to whether the cable is buried, run through a conduit underground, attached to poles or run from building to building.

FIG. 1 is an exemplary plat 101 (without land base underlay) that illustrates the kind of information and nomenclature typically found in plats describing telephone facilities. A central office 102 is shown having a cable 104 connected to a feeder distribution interface (FDI) 106. As shown in exemplary plat 101, cable 104 is buried, 500 feet long and comprises 100 26-gauge copper wire pairs. Cable 104 is assigned 1 as its cable identifier. Collectively, the copper wire pairs contained in cable 104 are identified by the pair range 1–100 with 4 complements (typically 25 pairs @), 1–25, 26–50, 51–75, 76–100.

FDI 106 serves as a cross connect point or cross box. In essence, FDI 106 provides a mechanism for connecting facilities feeder to distribution without requiring separate splicing. Plat 101 provides descriptive information for FDI 106. As shown in plat 101, the address of FDI 106 is 100 Main Street. In addition, plat 101 shows that FDI 106 has capacity for 300 input cable pairs. The feeder cable and cable pairs are identified by the cable:pair range 1:1–300. However, as shown in plat 101, only 100 cable pairs (pairs 1–100) are currently connected (spliced) to FDI 106. The remaining capacity for 200 feeder cable pairs (identified as dd:101–300) is unused. FDI 106 outputs cable pairs 1–600 identified with a cable ID of 101. The feeder/distribution characteristics of FDI 106 can be described as in count of cable 1, pairs 1 through 100 and an out count of cable 101, pairs 1 to 600.

FDI 106 has a distribution cable 108. Distribution cable 108 is characterized on plat 101 as a buried 800-foot copper cable containing 200 26-gauge copper wire pairs. Cable 108 is assigned the cable identifier 101, and the 200 copper wire pairs are identified by the cable:pair range 101:1–200.

Cable 108 is spliced into a cable 110 at a splice 109. Cable 110 is described on plat 101 as a buried 700-foot copper cable containing a 25 24-gauge copper wire pairs. Cable 110 is identified by the cable identifier 101 and the 25 pairs are identified by the pair range 101:1–25.

Cable 110 is coupled to a terminal 112. As shown in plat 101, terminal 112 is a distribution terminal. A distribution terminal is a service provisioning access point. Typically, a distribution terminal has an in count, but no out count. As shown in plat 101, terminal 112 has an input for the 25 copper wires contained in cable 110 identified as 101: 101–125.

A second form of plats is known as mechanized plats. Mechanized plats have been used to store information about telephone network facilities in the facilities database. A mechanized plat is an intelligent graphic, in which the physical facilities shown in the plat are linked to a database that contains information about the facilities rather than simply being scanned and stored. Exemplary facilities databases that can store mechanized plats include PLRMS from Intergraph of Huntsville, Ala.; EWO from Byers Engineering of Atlanta, Ga.; and Network Engineer from Mesa Solutions of Huntsville, Ala. Mechanized plats provide significantly greater flexibility than paper plats or simple scanned plats. For example, mechanized plats provide the ability to perform automatic traces on a given pair range.

The second basic system for storing telephone system network information is an assignment system. An exemplary assignment system is the Loop Facility Assignment and Control System (LFACS) produced and supported by Telcordia. LFACS is a circuit provisioning or assignment database application that is used by most of the Regional Bell Operating Companies (RBOCS).

LFACS models the telecommunications network as a series of cable-pairs and terminals. A cable-pair originates at either a central office feeder or an FDI x-BOX (Distribution). LFACS determines circuit assignments to provide service to customers. Based on "will serve" information, each circuit assignment is identified by a circuit identifier (CKID) and associated with a customer telephone number. Storage of LFACS circuit assignments is described with respect to FIG. 2.

FIG. 2 is a schematic illustration of facilities information corresponding to FIG. 1. LFACS first identifies the terminal which serves the customer's address, (will serve) such as terminal 210 in FIG. 2. LFACS then attempts to find cable pairs from terminal 210 back to the central office which are compatible with the customer's service. The set of cable pairs so determined are the circuit assignments for providing the customer service to the customers.

The assignments are made according to a set of rules. For example, one rule is that only cable pairs compatible with the service to be provided to the customer can be used. For example, a cable pair that is provisioned for T-1 data service will not be assigned to provide plain old telephone service. Another rule that LFACS follows in making circuit assignments is whether a proposed assignment has capacity to handle the service that the customer desires. For example, if a customer desires ADSL service, LFACS can look at loss calculations or an ADSL "flag" to ensure that the proposed assignment can support the ADSL service. Another consideration that is used is the length of the proposed circuit. For example, the maximum length from a central office for ADSL service is 18,000 feet. Thus, the proposed assignment for ADSL service must be within this distance from the central office. The gauge of the wire is also a consideration in loss calculations for making circuit assignments. For example, lower gauge wire can be used to carry higher capacity data over longer distances.

If LFACS finds a compatible cable pair that can provide the service to the customer, LFACS follows the cable pair to the terminal where that cable pair originates. For example, referring to FIG. 2, if LFACS determines that a cable pair in cable:pair range 101:101–125 feeding terminal 210 can provide the service, LFACS follows the cable pair to where it originates. In this case the cable pair originates at FDI 206 through cable 208. LFACS then searches for compatible cable pairs which originate in the central office 202 through cable 204 that can be cross-connected through FDI 206 to the cable pair in cable:pair range 101:101–125 that was identified by LFACS. For example, assuming compatibility exists, a customer desiring POTS service might be assigned cable 101, pair 107 at FDI 206, and then cross-connected to cable 1, pair 1 at central office 202. This circuit is assigned a circuit ID such as a telephone number, for example, (555) 123-4567.

To ensure compatibility when it is generating circuit assignments to provide customer service, LFACS stores facility information for each terminal facility in the telephone network. This information, for example, includes length and gauge information for each wire pair or group of wire pairs that are distributed from a terminal in the telephone network. For example, for terminal 206, cable 1 pairs 1 through 100, LFACS can store information for that entire pair range or for subsets of that pair range, depending on how they are routed through the network.

As shown in FIG. 1, cable 1, pairs 1 through 100 all take the same path. Thus, LFACS stores 800 feet of 26-gauge cable for this pair range. If one or more of those cable pairs had divergent paths at some point, and then come back together at terminal 206, LFACS can store that information as well. For example, cable pairs 1 to 50 may have been that 800 feet of 26-gauge wire cable pairs and cable pairs 51 to 100 may have been 400 feet of 26-gauge wire cable pairs with an additional 200 feet of 24-gauge wire.

It can be seen that the facilities database system stores data that can be used to determine various criteria. For example, the length and gauge information stored in the facilities database can be used to determine loss characteristics of a potential circuit. The assignment database (e.g., LFACS) stores the relationship between a circuit and its different components.

A relationship was built into LFACS to store length and gauge information corresponding to the wire pairs it stores. This relationship is called a terminal make-up (TMU). Referring to FIGS. 1 and 2, for example, the TMU for terminal 210 is 800 feet of 26-gauge copper wire followed by 700 feet of 24-gauge copper wire. The TMU for terminal 206 is 500 feet of 26-gauge copper wire.

A loop make-up is the combination of the TMUs for a particular circuit. For example, for the circuit assigned to telephone number (555) 123-4567 described above, the LMU is 26:500 x 26:800, 24:700 (where "x" indicates a cross point from central office 202 to FDI 206.

Historically, TMU data was entered into LFACS manually. This process is time consuming and prone to error. The use of mechanized plats allowed this process to be automated using an extract from LFACS. An extract is a text file that is generated from LFACS for a particular wire center. The extract lists some or all of the terminals that exist in LFACS. The basic properties of the extract text file include the terminal name and the complements which are associated with that terminal.

An extract is taken from LFACS and input to a computer application. The computer application runs the loop make-up process for every terminal in that extract and then automatically stores the loop make-up information into LFACS.

FIG. 3 is a flow chart illustrating the automatic process for generating and storing LMUs using LFACS extracts. In step 302, a terminal name is retrieved from the LFACS extract, along with its associated complements. As used herein, a complement refers to a pair range, i.e., a range of cable wire pairs. LFACS searches the mechanized plats (stored in the facilities database) for a matching terminal name in step 304. If there is no terminal name match (as determined in step 306), the system generates an error in step 312. If the terminal name does exist, then the system continues in step 308 by determining whether the complement associated with the terminal exists in the facilities database. If the complement does not exist, an error is generated in step 312. If the complement does exist, the system attempts to run LMU to perform the assignment in step 310. In step 314, the system determines whether the LMU operation completed successfully. If the operation completes successfully, the resulting loop make up is entered into LFACS in step 316. Otherwise, an error is generated in step 312.

Thus, this process is dependent upon matching terminal names. There is a fundamental problem with this dependency. That problem is that there is no tool that enforces data integrity between the assignment and facilities databases. For example, approximately 70–80% of the errors reported by step 312 result because no matching terminal is found in the facilities database in step 306. This is true even where "fuzzy" logic is used to try to make the match, in which names do not have to match exactly.

SUMMARY OF THE INVENTION

The present invention solves the foregoing problems associated with lack of data integrity between the facilities database and assignment database by eliminating the need to match terminal names. Instead, the present invention eliminates the need for determining a terminal name match in the facilities database.

In one embodiment, the present invention is a method for generating LMUs for use in creating circuit assignments in a telephone network. The method comprises the steps of receiving an extract from a assignment database system and obtaining a pair range from the extract. The method continues with the steps of determining a terminal name associated with the pair range and determining if the terminal name exists in a facilities database. The method also includes the step of generating an LMU associated with the pair range if the terminal name does not exist in the facilities database. In addition, the method can include the steps of recited determining that the terminal name does not exist in the facilities database and determining a furthest feature from the origination of the pair range. Then the method continues with the step of generating an LMU in accordance with the determined furthest feature.

In another embodiment, the present invention is a system for generating LMUs. The system comprises a facilities database system that stores mechanized plats, the mechanized plats containing intelligent graphics describing facilities in a telephone network, wherein the mechanized plats are used to automatically create an LMU. In addition, the system includes an assignment database that stores the LMU and uses the LMU to generate circuit assignments to provide service to telephone system subscribers. An extract is generated by the assignment database, the extract including at least one complement and a terminal name corresponding to the complement. In the system, a processing computer to receive the extract and use the information in the extract to generate the LMU.

In another embodiment, the present invention, determines a furthest feature from the origination of a particular pair range. Using the determined furthest feature, the present invention generates one or more LMUs, by running the loop make-up for the circuit from the determined furthest feature to the origination of the pair range, thereby eliminating the need to match terminal names to generate LMUs. The present invention can determine LMUs for a pair range as a whole or for individual complements in the pair range.

The present invention can be used independently or in conjunction with conventional systems. That is, the present invention can be used as a back up to conventional systems for cases where the conventional system cannot find a terminal match. In this configuration, first conventional processing is run. If the conventional run results in a failure, the technique of the present invention can be used to generate LMUs.

DETAILED DESCRIPTION OF THE INVENTION

Figure 4:
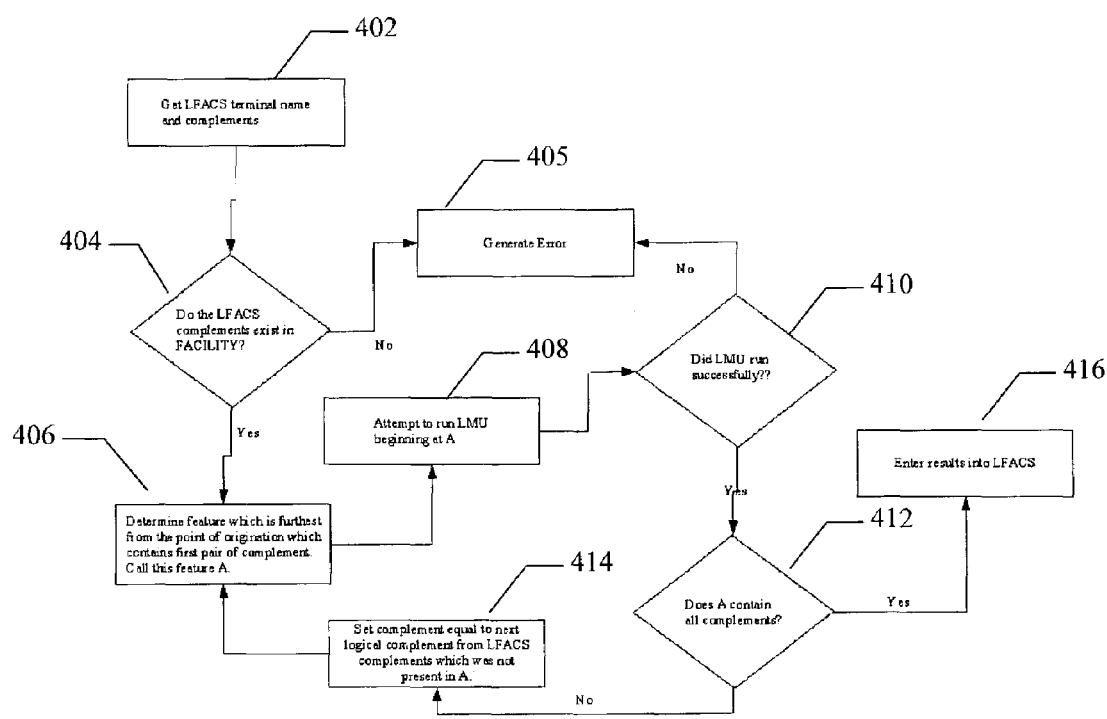
FIG. 4 is a flow chart for a method for generating and storing LMUs in a telephone network assignment database system according to an exemplary embodiment of the present invention.

FIG. 4 is an exemplary flow chart for a preferred embodiment of the present invention. The method can be performed by any computer that can be configured to carry out the steps described below. Such computers are well-known to those skilled in the art and need not be described further. The computers can be located anywhere and need not be in the same location provided they can communicate.

The method begins in step 402 with the step of obtaining LFACS terminal names and complements from an extract. As described above, the term "complement" as used herein refers to a wire pair ranges. The term "pair range" is used herein interchangeably with the term "cable pair range."

In step 404, the method continues by determining if all of the complements contained in the extract exist in the facilities database. If they do not, an error report is generated in step 405. For example, if the cable:pair range 1:1–100 were requested in the extract from LFACS, and there is no record of cable:pair range 1:1–100 in the facilities database, the present invention generates an error report advising a user that the requested complement was not found in the facilities database.

If the complements do exist, the method continues in step 406 with the step of determining the feature furthest from the point of origination of the pair range that contains the complement in the pair range contained in the extract. As used in the detailed description herein, the term "feature" refers to a facility that is represented in an intelligent way in the mechanized facilities database. That is, a feature is used to describe an intelligent facility element that is stored in the telephone network facilities database and its corresponding descriptive databases. Features include such physical elements as cables, poles, terminals and conduit that are represented in an intelligent manner in the mechanized facilities database. Thus, a furthest feature is a feature that is furthest from the point origination of the pair range that contains the complement in the pair range contained in the extract.

Once the furthest feature has been determined, the method continues in step 408 with the step of executing a loop make-up routine from that feature back to where a circuit that can reach the furthest feature originates (e.g., a central office or a terminal). If the loop make-up routine does not complete successfully, the method continues in step 405 with the step of generating an error report advising a user that the loop make-up routine did not complete successfully. If the loop make-up completes successfully (as determined in step 410), the method continues in step 412 with the step of determining whether all like pairs in the requested pair range have been identified. In one embodiment of the present invention, step 412 operates on pair ranges as a whole. In another embodiment of the present invention, step 412 operates on wire pairs in the pair range individually.

When operating using the pair range as a whole, an LMU is generated for the feature that is furthest from the origination of every cable pair in the identified pair range. Thus, if the pair range includes cable pairs that do not extend to a proposed furthest feature, a different feature must be selected as the furthest feature. This process continues until a furthest feature is found that is furthest from the origination of every cable pair in the pair range.

In the individual complement embodiment, an LMU can be generated for a furthest feature corresponding to each complement in the pair range. Thus, a plurality of LMUs can be generated. In addition, like complements can be grouped together for like processing. However, individually processing the complements generally requires additional processing time. The difference in the embodiments is explained further in the example discussed later with respect to FIG. 6.

If all of the complements for the particular pair range have been analyzed in step 412 (whether as a whole or individually), the method continues in step 414 with the step of analyzing the next logical complement (i.e., the next pair range) from the LFACS extract that has not already been analyzed. The process continues until in step 412 the method determines that all of the complements have been analyzed.

When all of the complements have been analyzed, the method continues in step 416 with the step of entering the results into LFACS.

The present invention can also generate LMUs where there are "encapsulated plant" and "Ready Access Section of Plant" (RA/SOP) facility types. Both encapsulated plant and RA/SOP facilities are terminal types that do not exist in the facilities database as terminals. Encapsulated plant is a terminal that is buried, usually in a subdivision. Technicians cannot access such a terminal easily because it is buried. Because it cannot be easily accessed, it is not shown on the plats as a terminal. RA/SOP treats multiple pairs and the associated RA terminals as one entity.

As a result, such entities do not exist as terminals and are therefore not recorded on plats as terminals. Because the present invention looks for a furthest feature, rather than terminal names, it can process encapsulated plant and RA/SOP facility types as well.

Figure 5A:
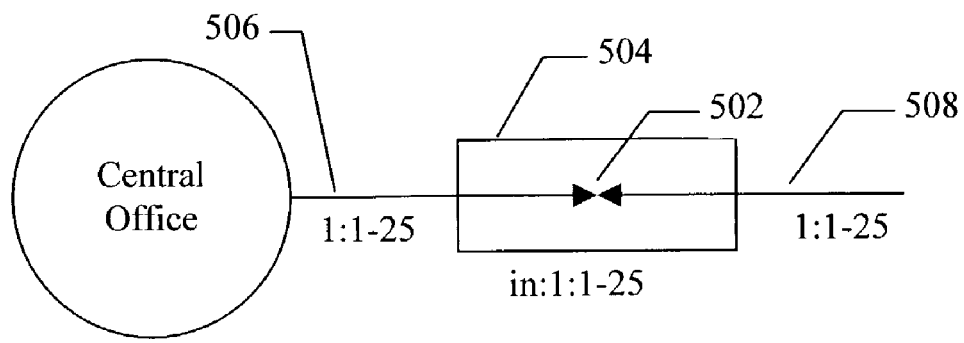
FIGS. 5A and 5B are schematic diagrams illustrating bridge taps in a telephone network.

The present invention also handles a feature known as a bridge tap. A bridge tap is a splice that allows a single cable to supply complements from a single cable to more than one terminal in multiple. Two exemplary bridge tap configurations are illustrated schematically in FIGS. 5A and 5B with identified cable:pair ranges. FIG. 5A illustrates a bridge tap 502 in a terminal 504. The bridge tap splices cables 506 and 508. In this case, cable 508 is an end section. An end section is a cable that is connected to a terminal at one end and not connected to anything at the other end. The bridge splice allows cable 508 to carry all or some of the complements comprising cable 506.

Figure 5B:
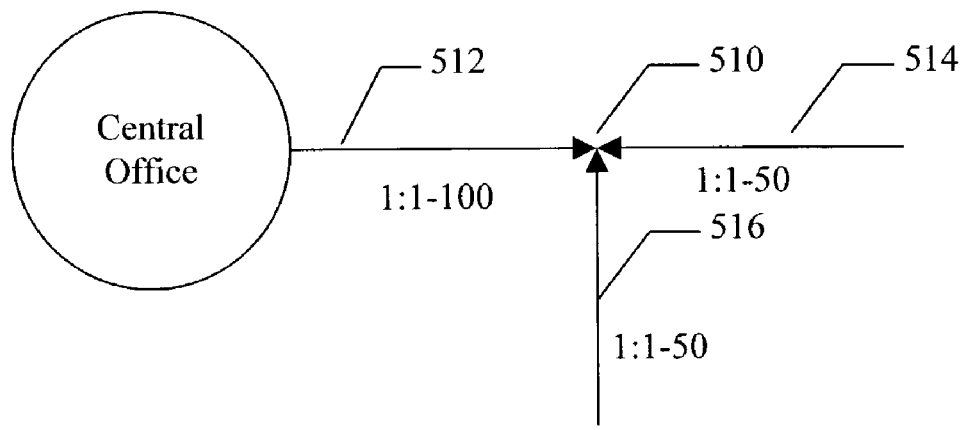

FIG. 5B illustrates schematically another configuration for a bridge tap. As shown in FIG. 5B, a bridge tap 510 splicing a cable 516 into a splice of cables 512 and 514. As a result of the bridge tap, cable 516 can carry one or more of the complements comprising cable 512.

Figure 6:
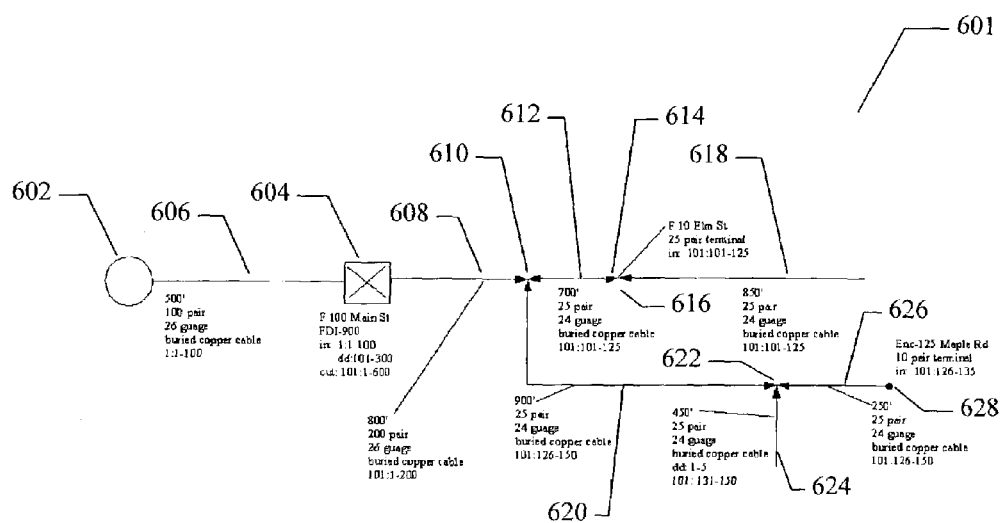
FIG. 6 is a schematic diagram of an exemplary plat that can be stored in a facilities database in a telephone network.

FIG. 6 illustrates an exemplary mechanized plat 601 that can be stored in a mechanized facilities database that is used herein to provide an example of the present invention. As described above, mechanized plat 601 is representative of the type of information that is stored in a mechanized facilities database. A central office 602 is connected to a terminal 604 by a cable 606. Cable 606 is a 500-foot buried copper cable. Cable 606 is identified in the plat as cable 1 and has 100 wired pairs of 26-gauge wire identified by the cable:pair range 1:1–100.

Terminal 604 is an FDI identified as F 100 Main Street. Terminal 604 has capacity to input 300 complements. However, only 100 complements are shown connected. The 100 inputs in use are connected to the pair range in cable 1 identified as 1:1–100.

Terminal 604 has the capacity to output 600 complements on cable 608. Cable 608 has the cable identifier 101. The pair range identifying the complements and cable on which they are output is 101:1–600. Cable 608 is an 800-foot long buried copper cable having 200 pairs of 26-gauge wire. The 200 pairs of cable 608 are identified by the cable:pair range 101:1–200.

Cable 608 is connected to a cable 612 through a splice. Cable 612 has a cable identifier of 101. Cable 612 is a 700-foot buried copper cable having 25 pairs of 24-gauge wire. The 25 pairs are identified by the cable:pair range 101:101–125. Thus, cable 612 is spliced to pairs 101:1–125 of cable 608. Cable 612 terminates at a terminal 614 identified in the exemplary plat as F 10 Elm St.

Cable 612 is a 25 pair terminal for coupling the cable:pair range 101:101–125 of cable 612. A bridge tap 616 is used to splice cable 612 to an end section cable 618. End section cable 618 can be used to extend the length of the complements in cable:pair range 101:101–125. End section cable 618 has a cable identifier of 101. End section cable is an 850-foot buried copper cable having 25 pairs of 24-gauge wire. The 25 pairs are identified by the cable:pair range 101:101–125.

A cable 620 is also spliced into bridge tap 610. Cable 620 has a cable identifier of 101. Cable 620 is a 900-foot buried copper cable having 25 pairs of 24-gauge wire. The 25 pairs are identified by the cable:pair range 101:126–150.

Cable 620 is spliced to cable 624 and 626 at a bridge tap 622. Cable 624 has a cable identifier of 101. Cable 624 is a 450-foot buried copper cable having 25 pairs of 24-gauge wire. The 25 pairs are identified by the cable:pair range 101:131–150, indicating that 5 of the pairs (101:126–130) are unconnected. Cable 626 has a cable identifier of 101. Cable 626 is a 250-foot buried copper cable having 25 pairs of 24-gauge wire. The 25 pairs are identified by the cable:pair range 101:126–150. Cable 626 terminates at a terminal 628. Terminal 628 is an encapsulated terminal that input 10 wire pairs from cable 101 identified as 101: 126–135.

In this example, several facilities exist but are not shown in FIG. 6. The facilities that are not shown represent facilities that, for some reason, have been omitted or incorrectly entered into the facilities database. These facilities include a terminal identified as S 10 Oak Rd. and a terminal identified as R 300 First Ave. Terminal S 10 Oak Rd. has capacity to input 25 wire pairs identified as 101:101–125. Terminal R 300 First Ave. has capacity to input 25 wire pairs identified as 101:126–150. The present invention can process these by looking for the furthest feature from the origination of the cable pair. That origination is typically a central office, an FDI or a remote terminal.

Figure 1:
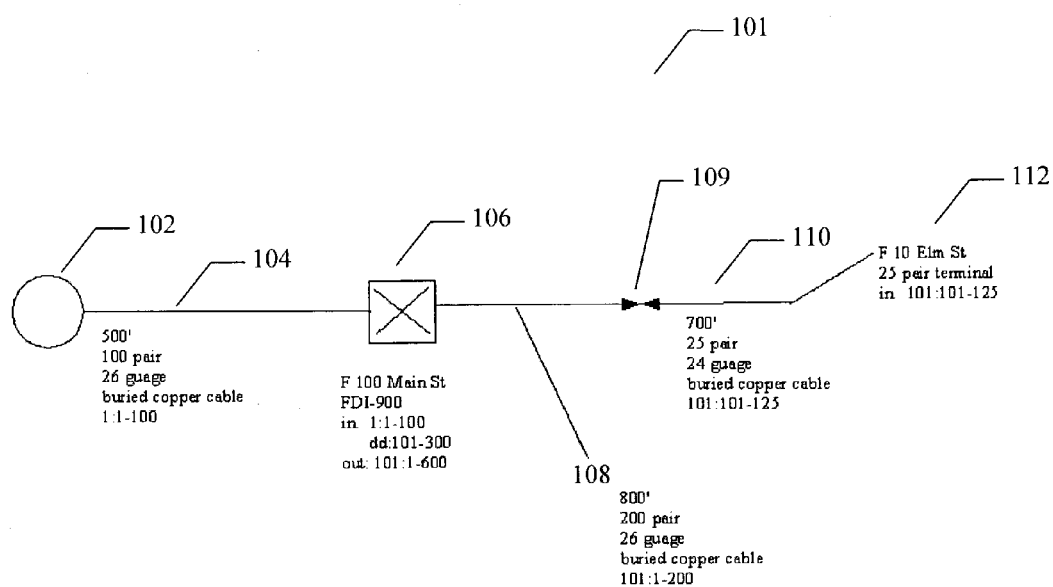
FIG. 1 is a schematic diagram of an exemplary plat that can be stored in a telephone network facilities database.
Figure 2:
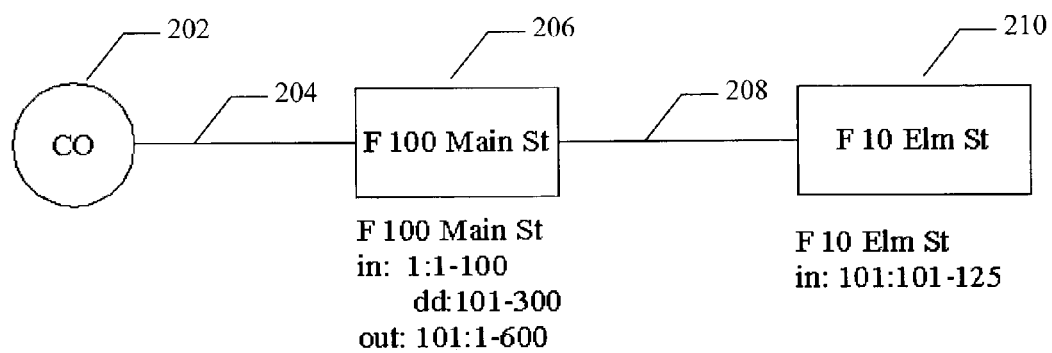
FIG. 2 is a schematic diagram illustrating exemplary facilities relationship information that can be stored in a telephone network assignment database such as LFACS.
Figure 3:
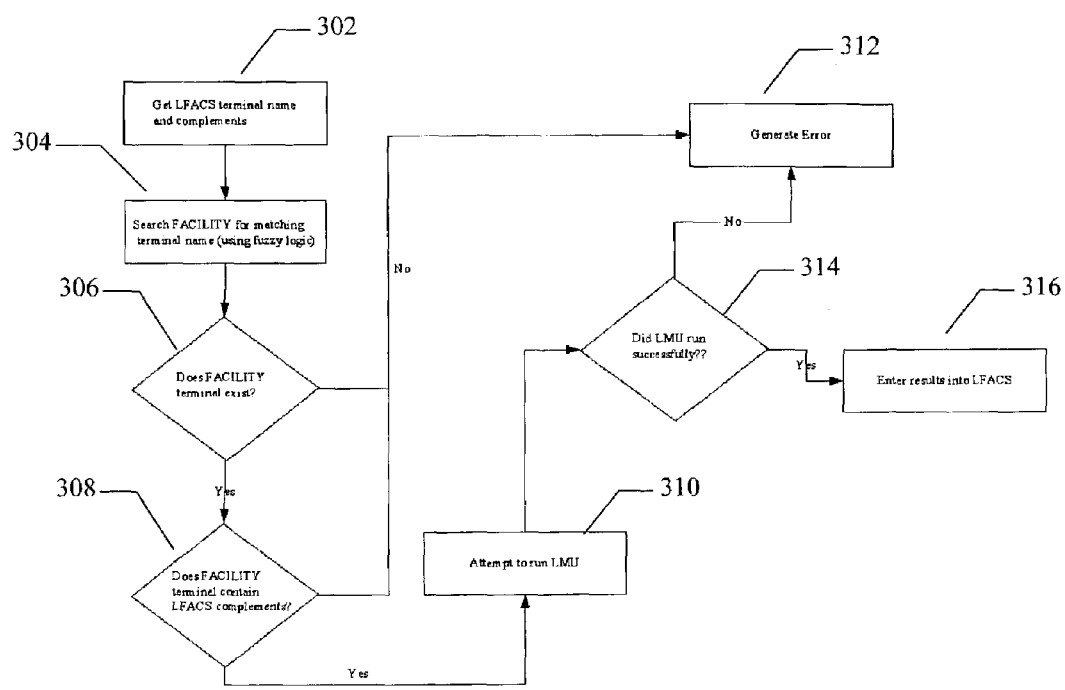
FIG. 3 is a flow chart for a conventional method for generating and storing LMUs in a telephone network assignment database system.

Table 1 illustrates how LMUs are generated and stored in the assignment database from mechanized plat 601 using the conventional method of FIG. 3 and the method of the present invention illustrated in FIG. 4 (where step 412 processes the pair range as a whole). In Table 1, lengths are provided in 1000 s of feet. For example, in the table 800 feet is represented as 0.8.

TABLE 1

| LFACS Terminal | LFACS Complement | Prior Art Method (FIG. 3) | Present Invention (FIG. 4) |
| --- | --- | --- | --- |
| F 10 Elm St | 101:101–125 | 26:.8, 24:.7, es 24:.85 | 26:.8, 24:.7, es 24:.85 |
| S 10 Oak Rd | 101:101–125 | Error | 26:.8, 24:1.55 |
| Enc-125 Maple Rd | 101:126–130 | Cannot Process | 26:.8, 24:1.15 |
| R 300 First Ave | 101:131–150 | Error | 26:.8, 24:1.35 BT: 24:.25 @ 1.7 |

Table 2 illustrates how LMUs are generated and stored in the assignment database from mechanized plat 601 using the conventional method of FIG. 3 and the method of the present invention illustrated in FIG. 4 (where step 412 processes complements in the pair range individually). In Table 2, lengths are provided in 1000 s of feet. For example, in the table 800 feet is represented as 0.8.

TABLE 2

| LFACS Terminal | LFACS Complement | Prior Art Method (FIG. 3) | Present Invention (FIG. 4) |
|---|---|---|---|
| F 10 Elm St | 101:101–125 | 26:.8, 24:.7, es 24:.85 | 26:.8, 24:.7, es 24:.85 |
| S 10 Oak Rd | 101:101–125 | Error | 26:.8, 24:1.55 |
| Enc-125 Maple Rd | 101:126–135 | Cannot Process | LMU1 (101:126–130) |
| | | | 26:.8, 24:1.15 |
| | | | LMU2 (101:131–135) |
| | | | 26:.8,24:1.35 BT:24:.25 @ 1.7 |
| R 300 First Ave | 101:131–150 | Error | 26:.8,24:1.35 BT: 24:.25 @ 1.7 |

Thus, the present invention is able to process the missing terminals S 10 Oak Rd. and R 300 First Ave. because it looks for a furthest feature rather than a terminal name. This furthest feature exists, whereas for these two terminals, there is no corresponding terminal name in the facilities database. As a result, the present invention is able to create an LMU, whereas the conventional methodology fails.

In addition, the present invention is able to process the encapsulated plant located at 125 Maple Rd. Because the encapsulated plant is not stored in the facilities database as a terminal, the conventional method would not be able to process it. The present invention, on the other hand, is able to process the encapsulated plant because it is looking for a feature as opposed to a terminal name.

Further, it can be seen that processing the complements individually provides more flexibility, for example, generating multiple LMUs. However, the increased flexibility comes at a cost of higher processor requirements.

In another embodiment of the present invention, the method of FIG. 4 is performed after the method of FIG. 3 is tried and fails. That is, first the conventional method for generating and storing LMUs is performed. If that method fails, the method for generating and storing LMUs described above with respect to FIG. 4 is performed.

Figure 7:
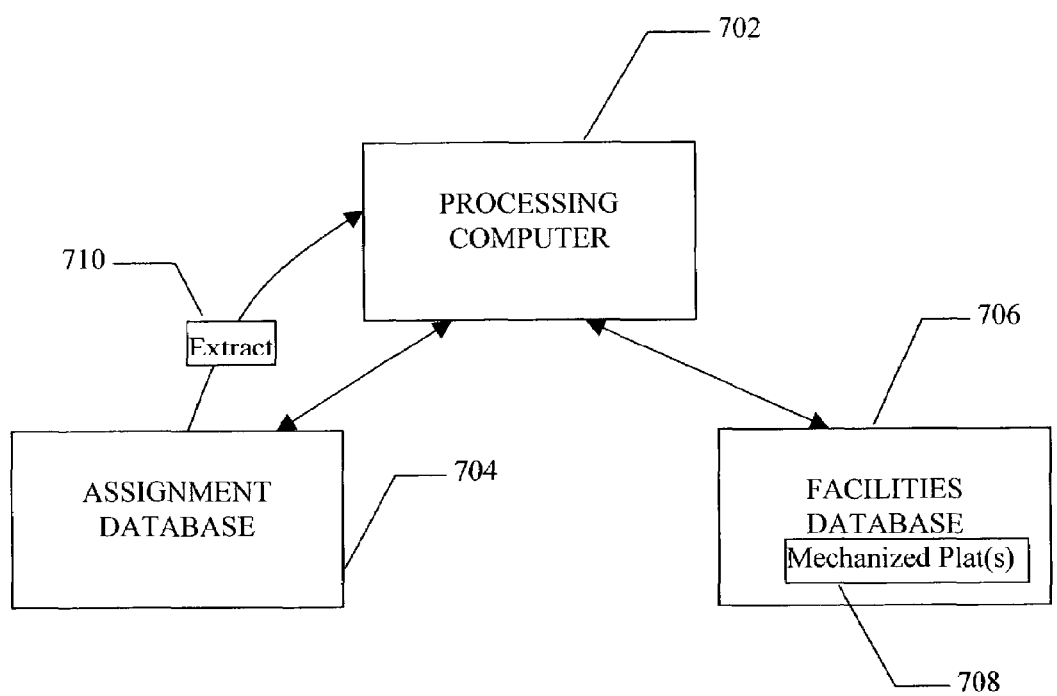
FIG. 7 is a schematic diagram of a system for improving the automated loop makeup process according to an embodiment of the present invention.

FIG. 7 is a schematic diagram of a system according to an embodiment of the present invention. A computer 702 is coupled to a telephone system assignment database 704 and a telephone system facilities database 706. Computer 702 is any computer that can be configured to carry out the methods of the present invention described above. Such computers are well-known to those skilled in the art and need not be described further. Assignment database 704 is a system that can generate telephone circuit assignments such as the LFACS system described above. Telephone system facilities database 706 is a system that can store one or more mechanized plats 708 such as the PLRMS, EWO and Network Engineer facilities database described above. As shown in FIG. 7, an extract 710 is received by processing computer 702. Processing computer 702 processes the extract in accordance with the methods described above to generate LMUs that can be used to assist it in its assignment generation function.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for generating loop make-ups (LMUs) for use in creating circuit assignments in a telephone network, said method comprising the steps of:
   (a) receiving an extract from an assignment database system;
   (b) obtaining a pair range from the extract;
   (c) determining a terminal name associated with the pair range;
   (d) determining if the terminal name exists in a facilities database;
   (e) generating an LMU associated with the pair range if the terminal name does not exist in the facilities database;
   (f) determining that the terminal name does not exist in the facilities database;
   (g) determining a furthest feature from an origination of the pair range; and
   (h) generating the LMU in accordance with the determined furthest feature.

2. The method recited in claim 1, further comprising the steps of:
   (i) determining at least one additional furthest feature from the origination of the pair range; and
   (j) determining at least one additional LMU in accordance with the at least one additional determined furthest feature.

3. The method recited in claim 1, further comprising the step of generating an error report if the LMU is not generated successfully.

4. The method recited in claim 1, further comprising the steps of:
(i) determining whether the pair range exists in the facilities database; and
(j) generating an error report if the pair range does not exist in the facilities database.

5. The method recited in claim 1, further comprising the steps of:
(i) determining whether the furthest feature can be reached by all complements in the pair range;
(j) setting a new complement equal to the next logical complement that was not in the pair range; and
(k) repeating steps (g) through (j) for the new complement.

6. The method recited claim 1, further comprising the step of generating the LMU using conventional processing if the terminal name exists in the facilities database.

7. A system for generating loop make-ups (LMUs) for use in creating circuit assignments in a telephone network, comprising:
means for receiving an extract from an assignment database system;
means for obtaining a pair range from the extract;
means for determining a terminal name associated with the pair range;
means for determining if the terminal name exists in a facilities database;
means for generating an LMU associated with the pair range if the terminal name does not exist in the facilities database;
means for determining that the terminal name does not exist in the facilities database;
means for determining a furthest feature from an origination of the pair range; and
means for generating the LMU in accordance with the determined furthest feature.

8. The system recited in claim 7, further comprising:
means for determining at least one additional furthest feature from the origination of the pair range; and
means for determining at least one additional LMU in accordance with the at least one additional determined furthest feature.

9. The system recited in claim 7, further comprising means for generating an error if the LMU is not generated successfully.

10. The system recited in claim 7, further comprising:
means for determining whether the pair range exists in the facilities database; and
means for generating an error if the pair range does not exist in the facilities database.

11. The system recited in claim 7, further comprising:
means for determining whether the furthest feature can be reached by all complements in the pair range;
means for setting a new complement equal to the next logical complement that was not in the pair range; and
means for determining another LMU in accordance with the ext logical compliment.

12. The system recited claim 7, further comprising means for generating the LMU using conventional processing if the terminal name exists in the facilities database.

13. A system for generating loop make-ups (LMUs), comprising:
a facilities database system that stores mechanized plats, the mechanized plats containing intelligent graphics describing facilities in a telephone network, wherein the mechanized plats are used to automatically create an LMU;
an assignment database that stores the LMU and uses the LMU to generate circuit assignments to provide service to telephone system subscribers;
an extract generated by the assignment database, the extract including at least one complement and a terminal name corresponding to the complement;
a processing computer to receive the extract and use the information in the extract to generate the LMU, wherein the computer determines that the terminal name does not exist in the facilities database, and thereafter determines a furthest feature from an origination of the pair range and then generates the LMU in accordance with the determined furthest feature.

14. The system recited in claim 13, wherein the computer further determines at least one additional furthest feature from the origination of the pair range and further determines at least one additional LMU in accordance with the at least one additional determined furthest feature.

15. The system recited in claim 13, wherein the computer further determines whether the pair range exists in the facilities database and generates an error if the pair range does not exist in the facilities database.

16. The system recited in claim 13, wherein the computer further determines the furthest feature that can be reached by all complements in the pair range and sets a new complement equal to the next logical complement that was not in the pair range and determines another LMU in accordance with the new complement.

17. The system recited claim 13, wherein the computer further generates the LMU using conventional processing if the terminal name exists in the facilities database.

18. A method for generating loop make-ups (LMUs) for use in creating circuit assignments in a telephone network, said method comprising the steps of:
(a) receiving an extract from an assignment database system;
(b) obtaining a pair range from the extract;
(c) determining a terminal name associated with the pair range;
(d) determining that the terminal name does not exist in the facilities database;
(e) determining a furthest feature from an origination of the pair range if the terminal name does not exist in the facilities database; and
(f) generating an LMU in accordance with the determined furthest feature.

19. The method recited in claim 18, further comprising the steps of:
(g) determining at least one additional furthest feature from the origination of the pair range; and
(h) determining at least one additional LMU in accordance with the at least one additional determined furthest feature.

20. The method recited in claim 18, further comprising the steps of:
(g) determining whether the pair range exists in the facilities database; and
(h) generating an error report if the pair range does not exist in the facilities database.

21. The method recited in claim 18, further comprising the steps of:
(g) determining whether the furthest feature can be reached by all complements in the pair range;

(h) setting a new complement equal to the next logical complement that was not in the pair range; and (i) repeating steps (e) through (h) for the new complement.

22. The method recited claim 18, further comprising the step of generating the LMU using conventional processing if the terminal name exists in the facilities database.

* * * * *